United States Patent [19]

Kaneko

[11] Patent Number: 5,448,721
[45] Date of Patent: Sep. 5, 1995

[54] DUPLICATED COMMUNICATIONS PROCESSING SYSTEM AND COMMUNICATIONS SYSTEM INCLUDING THE DUPLICATED COMMUNICATIONS PROCESSING SYSTEM

[75] Inventor: Hirokatsu Kaneko, Kawasaki, Japan

[73] Assignee: Fujitsu Limited, Kanagawa, Japan

[21] Appl. No.: 4,514

[22] Filed: Jan. 14, 1993

[30] Foreign Application Priority Data

Jan. 14, 1992 [JP] Japan ............... 4-004426

[51] Int. Cl.⁶ ............................................ G06F 11/20
[52] U.S. Cl. .................................. 371/20.1; 395/873; 395/877; 395/180
[58] Field of Search ............... 371/8.1, 12, 9.1, 11.3; 395/575

[56] References Cited

U.S. PATENT DOCUMENTS

| | | | |
|---|---|---|---|
| 4,774,709 | 9/1988 | Tulplue et al. | 371/11.1 |
| 4,823,256 | 4/1989 | Bishop et al. | 364/200 |
| 5,008,805 | 4/1991 | Fiebig et al. | 364/184 |
| 5,157,663 | 10/1992 | Major et al. | 371/9.1 |

FOREIGN PATENT DOCUMENTS 58-19960 2/1983 Japan .
63-158636 7/1988 Japan .
4-120837 4/1992 Japan .

*Primary Examiner*—Hoa T. Nguyen

[57] ABSTRACT

In a duplicated communications processing system having a function of transferring data between a first system and a second system, a first communications device is connected to a first communications line and has n processes to be executed in the first communications device where n is an integer. A second communications device is connected to a second communications line and has n processes to be executed in the second communications device. A control unit determines whether or not one of the first and second communications device is down due to an overload resulting from data received via a corresponding one of the first and second communications lines, and inhibits m processes among the n processes from being executed in the other one of the first and second communications devices when determining that one of the first and second communications devices is down in order to reduce the load on the other one of the first and second communications devices, the above m being an integer smaller than the n.

20 Claims, 8 Drawing Sheets

F I G. 4

|  | STATUS 1 (NORMAL) | STATUS 2 (DOWN) |
|---|---|---|
| PROCESS A | 1 | 1 |
| PROCESS B | 1 | 0 |
| PROCESS C | 1 | 0 |

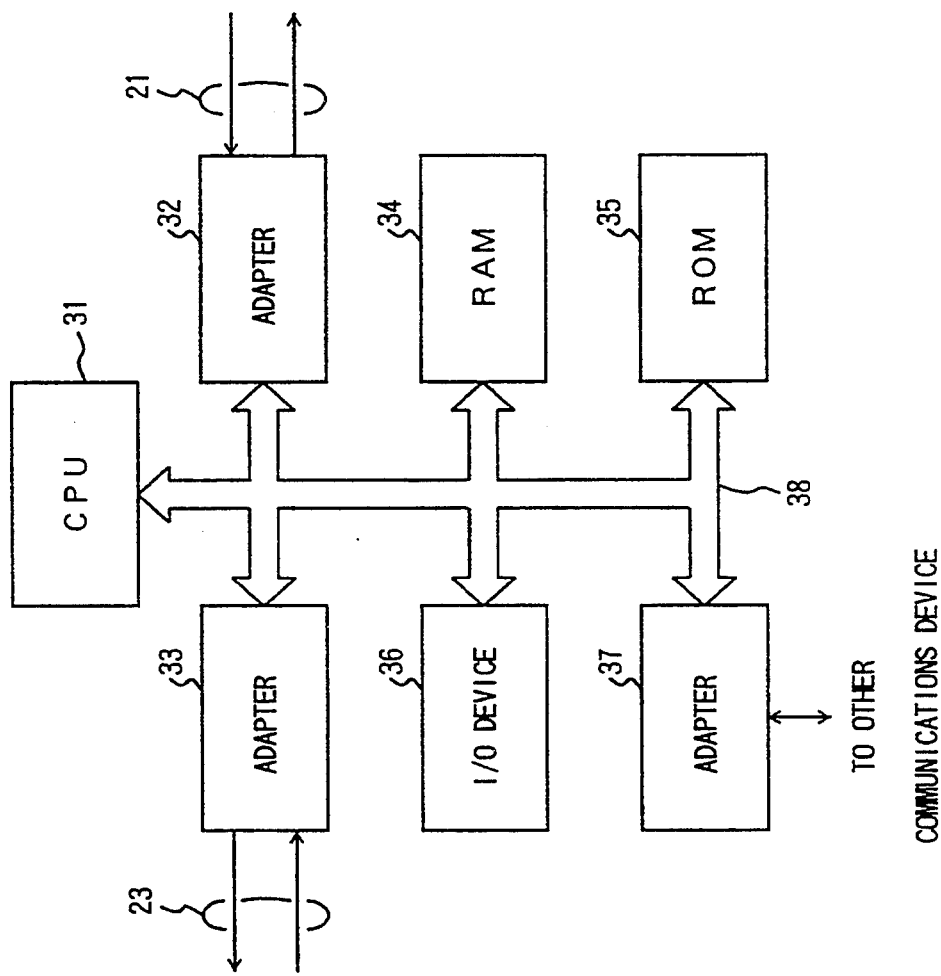
F I G. 5

DUPLICATED COMMUNICATIONS PROCESSING SYSTEM AND COMMUNICATIONS SYSTEM INCLUDING THE DUPLICATED COMMUNICATIONS PROCESSING SYSTEM

BACKGROUND OF THE INVENTION

1. Field of the Invention

The present invention generally relates to communications systems having duplicated communications systems.

2. Description of the Prior Art

FIG. 1 is a block diagram of a communications system having duplicated communications processing systems. The system shown in FIG. 1 has a duplicated configuration. Duplicated supervisory devices respectively supervise a system of a supervised object, such as a power feed system, and respectively send pieces of supervisory data to duplicated communications lines 2-1 and 2-2 via transmitter/receiver devices TX/RX. Then, the pieces of supervisory data are transferred to transmitter/receiver devices TX/RX connected to a host computer HC via communications processing systems 1-1, 1-2 and 1-3. The pieces of supervisory data transferred between the adjacent communications processing systems are indicated by reference number 3.

Each of the communications processing systems 1-1-1-3 comprises duplicated communications devices 11 and 12. Each of the communications devices 11 and 12 has a relay function of relaying data received via the corresponding communications line. Further, each of the communications devices 11 and 12 has additional functions. For example, each of the communications devices branches received data to another device or system (not shown), or extracts desired pieces of data from the received data for a specific use. For example, a display device (not shown) of each of the communications devices 11 and 12 displays necessary information on the basis of the extracted pieces of data.

The host computer HC supervises the status of the supervisory object on the basis of the supervisory information received from the transmitter/receiver devices TX/RX. Normally, pieces of identical supervisory data are separately transferred via the duplicated configuration. Even if one of the two systems malfunctions, necessary data can be transferred via the other system.

The host computer HC sends pieces of identical control data to the system via the transmitter/receiver devices TX/RX, the communications processing systems 1-3, 1-2 and 1-1, the transmitter/receiver devices TX/RX and the supervisory devices SV.

If a failure has occurred in the system to be supervised, an increased amount of supervisory data will be sent to the communications processing systems 1-1-1-3 from the supervisory devices SV via the transmitter/receivers TX/RX. In some cases, a large amount of supervisory data higher than a capability of each of the communications devices 11 and 12 may be generated. In these cases, each of the communications devices 11 and 12 fails to execute a process or processes having low priority, and is substantially down.

In order to reduce the loads on the communications processing systems to prevent the system from being down, some solutions have been proposed. For example, receipt of data is regulated when a buffer provided in each of the communications devices 11 and 12 becomes full of data. Alternatively, the communications devices 11 and 12 stop executing some processes, and share the processing of received data. However, even by the above solutions, it is impossible to completely prevent the generation of overloads of the communications devices 11 and 12.

With the above in mind, use of a watchdog timer has been proposed to rapidly recover the communications devices 11 and 12 from the down states. A watchdog timer is provided in each of the communications devices 11 and 12, and clears all data when the watchdog timer is not reset after a predetermined time. Then, default data is set in each of the communications devices 11 and 12, which are restarted by an initial program loading process.

However, in practice, both the communications devices 11 and 12 become down at almost the same time due to overloads arising from an increase in the amount of data. In this case, data cannot be transferred at all. The above fact greatly reduces reliability of the communications system.

SUMMARY OF THE INVENTION

It is a general object of the present invention to provide a duplicated communications processing system in which the above disadvantage is eliminated.

A more specific object of the present invention is to provide a duplicated communications processing system in which one of two communications devices provided therein continues to operate even if the other communications devices is down due to an overload resulting from an increased amount of received data.

The above objects of the present invention are achieved by a duplicated communications processing system having a function of transferring data between a first system and a second system, the duplicated communications processing system comprising: a first communications device which is connected to a first communications line and has n processes to be executed in the first communications device where n is an integer; a second communications device which is connected to a second communications line and has n processes to be executed in the second communications device; control means, coupled to the first and second communications devices, for determining whether or not one of the first and second communications device is down due to an overload resulting from data received via a corresponding one of the first and second communications lines and for inhibiting m processes among the n processes from being executed in an other one of the first and second communications devices when determining that the one of the first and second communications devices is down in order to reduce the load on the other one of the first and second communications devices, the above m being an integer smaller than said n.

Another object of the present invention is to provide a communications system having at least one duplicated communications processing system as described above.

BRIEF DESCRIPTION OF THE DRAWINGS

Other objects, features and advantages of the present invention will become more apparent from the following detailed description when read in conjunction with the accompanying drawings, in which:

FIG. 4 is a diagram of a process flag table shown in FIG. 3;

FIG. 5 is a block diagram of the hardware structure of a communications device shown in FIG. 3;

DESCRIPTION OF THE PREFERRED EMBODIMENT

Figure 2:
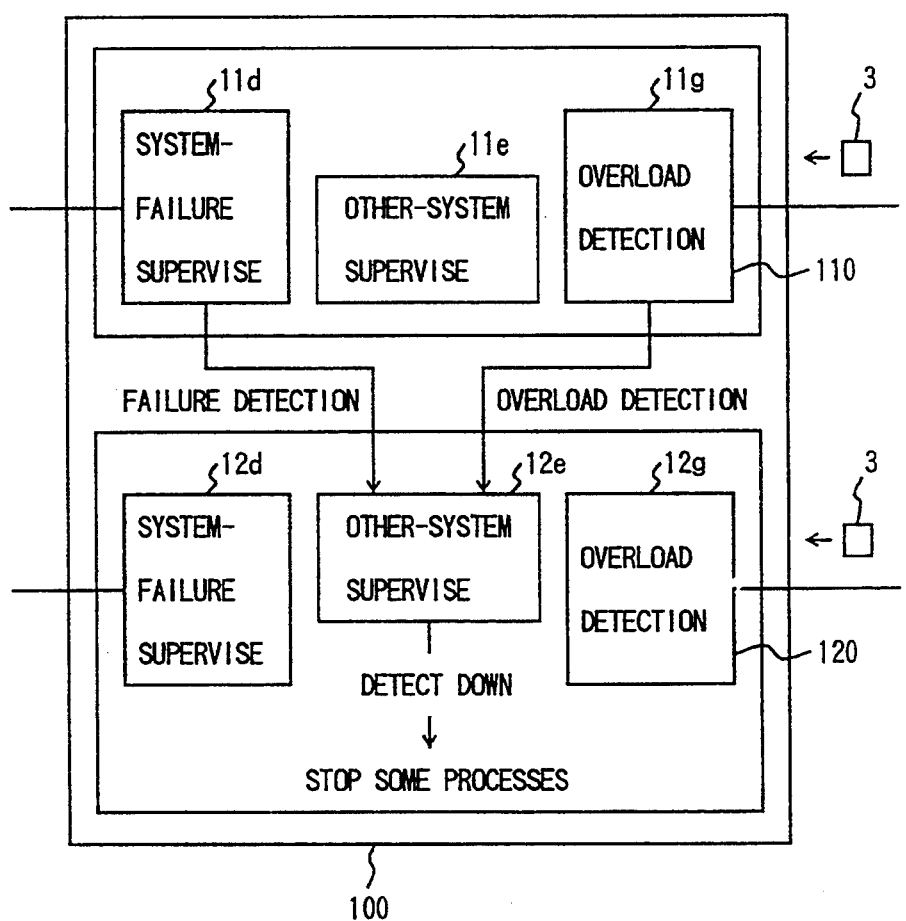
FIG. 2 is a block diagram of an overview of the present invention.

FIG. 2 is a block diagram showing an overview of the present invention. More particularly, FIG. 2 shows a duplicated communications processing system 100 including communications devices 110 and 120. Hereinafter, communications devices 110 and 120 are referred to as first and second communications devices. The first communications device 110 includes a system-failure supervisory unit 11d, a second-communications-device supervisory unit (other-system supervisory unit) 11e, and an overload detection unit 11g. Similarly, the second communications device 120 includes a system-failure supervisory unit 12d, a first-communications-device supervisory unit (other-system supervisory unit) 12e, and an overload detection unit 12g.

The system-failure supervisory unit 11d detects whether or not the communications device 110 has gone down, and sends a system failure detection signal to the first-communications-device supervisory unit 12e when determining that the first communications device 110 has gone down. The overload detection unit 11g detects occurrence of an overload of the first communications device 110 due to an increase in the amount of received data, and sends an overload detection signal to the first-communications-device supervisory unit 12e when detecting occurrence of an overload. The first-communications-device supervisory unit 12e starts to supervise the first communications device 110 in response to receipt of the overload detection signal from the unit 11g, and detects whether or not the system failure detection signal is received from the unit 11d under the overload condition of the first communications device 110. When the system failure detection signal is received, the first-communications-device supervisory unit 12e stops execution of predetermined functions of the second communications device 120 in order to prevent an overload of the second communications device 120 from arising. The predetermined functions of the second communications device 120 will have low priority levels of execution. Hence, even if one of the communications devices 110 and 120 has gone down, the other communications device continues to operate. Hence, reliability of the communications system can be improved.

The system-failure supervisory unit 12d detects whether or not the communications device 120 has gone down, and sends a system failure detection signal to the second-communications-device supervisory unit 11e when determining that the second communications device 120 has gone down. The overload detection unit 12g detects occurrence of an overload of the second communications device 120 due to an increase in the amount of received data, and sends an overload detection signal to the second-communications-device supervisory unit 11e when detecting occurrence of an overload. The second-communications-device supervisory unit 11e starts to supervise the second communications device 120 in response to receipt of the overload detection signal from the unit 12g, and detects whether or not the system failure detection signal is received from the unit 12d under the overload condition of the second communications device 120. When the system failure detection signal is received, the second-communications-device supervisory unit 11e stops execution of predetermined functions of the first communications device 110 in order to prevent an overload of the first communications device 110 from arising. The predetermined functions of the first communications device 110 will have low priority levels of execution. Hence, even if one of the communications devices 110 and 120 has gone down, the other communications device continues to operate. Hence, reliability of the communications system can be improved.

Figure 3:
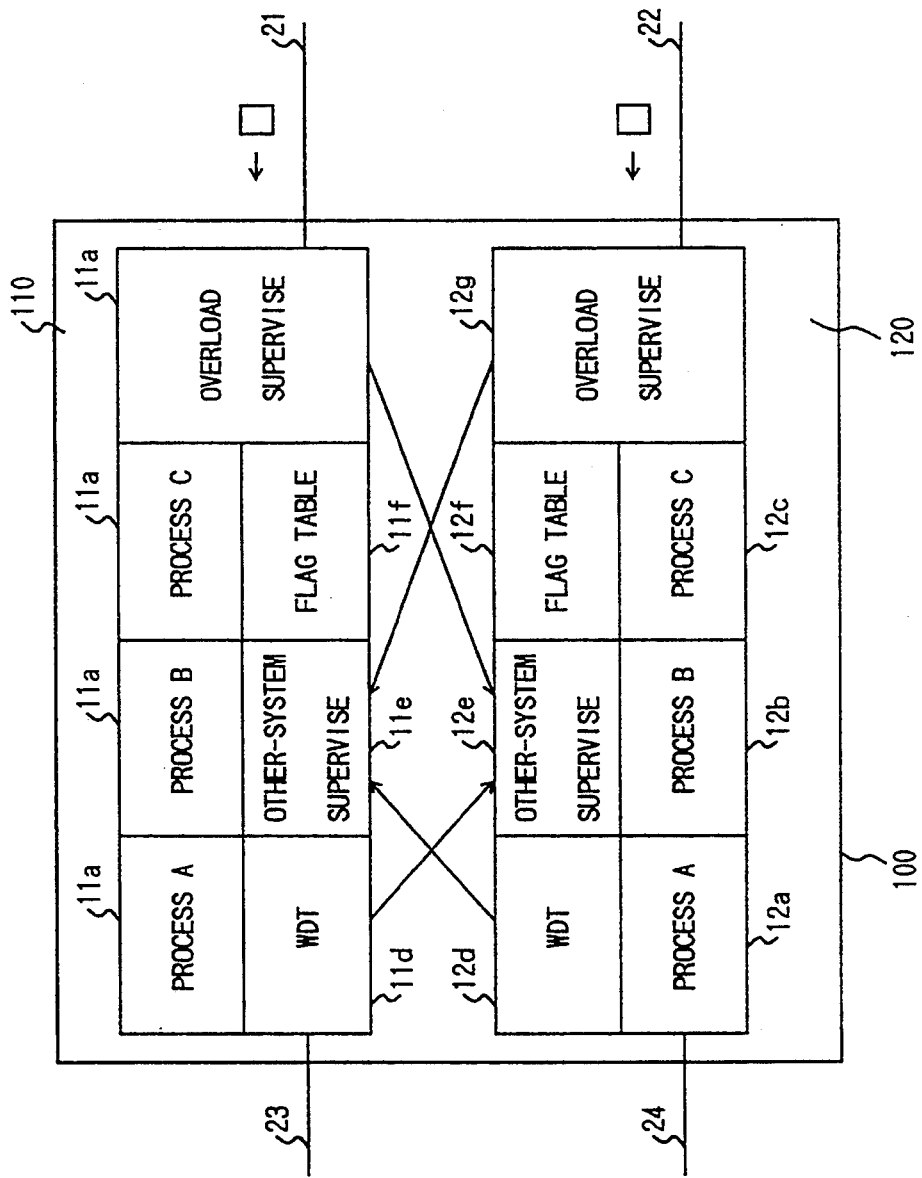
FIG. 3 is a block diagram of an embodiment of the present invention.

FIG. 3 is a block diagram of an embodiment of the present invention. In FIG. 3, parts that are the same as parts shown in FIG. 2 are given the same reference numbers. The communications device 110 comprises a process-A processing unit 11a, a process-B processing unit 11b, a process-C processing unit 11c, a watchdog (WDT) monitor unit 11d, a second-communications-device supervisory unit 11e, a process flag table 11f, and an overload supervisory unit 11g. Similarly, the communications device 120 comprises a process-A processing unit 12a, a process-B processing unit 12b, a process-C processing unit 12c, a watchdog (WDT) monitor unit 12d, a first-communications-device supervisory unit 12e, a process flag table 12f, and an overload supervisory unit 12g. The first communications device 110 is connected to communications lines 21 and 23, and the second communications device 120 is connected to communications lines 22 and 24.

Examples of the processes A, B and C that provide functions of the communications devices 110 and 120 will be described later. The watchdog timer monitor unit 11d has a watchdog timer, which is periodically reset when no failure has occurred in the first communications device 110. When the timer value of the watchdog timer monitor unit 11d reaches a predetermined value, the watchdog timer monitor unit 11d generates a system-failure detection signal. Similarly, The watchdog timer monitor unit 12d has a watchdog timer, which is periodically reset when no failure has occurred in the second communications device 120. When the timer value of the watchdog timer monitor unit 12d reaches a predetermined value identical to that of the unit 11d, the watchdog timer monitor unit 12d generates a system-failure detection signal.

The overload supervisory unit 11g detects whether or not the first communications device 110 is operating in the overload state. When the unit 11g determines that the first communications device 110 is operating in the overload state, it generates an overload detection signal. The overload supervisory unit 12g detects whether or not the second communications device 120 is operating in the overload state. When the unit 12g determines that the second communications device 120 is operating in the overload state, it generates an overload detection signal.

The second-communications system supervisory unit 11e receives the system-failure detection signal from the watchdog timer monitor unit 12d and the overload detection signal from the overload supervisory unit 12g, and executes a control process. In the control process, the supervisory unit 11e refers to the process flag table 11f, which stores information specifying processes to be stopped in response to receipt of the overload detection signal from the overload supervisory unit 12g.

FIG. 4 shows the contents of the process flag table 11f. Status 1 in the table 11f shows that the second communications device 120 is normally operating (normal state), and status 2 shows that the second communications device 120 is operating in the overload state. Flag data "1" indicates that a corresponding process should be executed, and flag data "0" indicates that execution of the corresponding process should be stopped. According to the table shown in FIG. 4, the process A is executed in both the normal state and the overload state, but the processes B and C are not executed in the overload state. The process flag table 12f has the same contents as shown in FIG. 4.

The first-communications system supervisory unit 12e receives the system-failure detection signal from the watchdog timer monitor unit 11d and the overload detection signal from the overload supervisory unit 12g, and executes the same control process as that of the second-communications system supervisory unit 11e. In the control process, the supervisory unit 12e refers to the process flag table 12f, which stores information specifying processes to be stopped in response to receipt of the overload detection signal from the overload supervisory unit 11g, as described above.

FIG. 5 is a block diagram of the hardware structure of the first communications device 110. The second communications device 120 has the same hardware structure as that of the first communications device 110. The first communications device 110 shown in FIG. 5 comprises a CPU (Central Processing Unit) 31, an adapter 32, an adapter 33, a RAM (Random Access Memory) 34, a ROM (Read Only Memory) 35, an I/O (Input/Output) device 36, an adapter 37, and a bus 38.

The CPU 31 controls the entire operation of the first communications device 110. The adapter 32 provides an interface between the communications line 21 and the bus 30 of the first communications device 110. The adapter 33 provides an interface between the communications line 23 and the bus 38 of the first communications device 38. The ROM 35 stores programs executed under control of the CPU 31. The RAM 34 functions as a working area of the CPU 31. The units 11a, 11b, 11c, 11d and 11g, and the flag table 11f shown in FIG. 3 are located in a storage area of the RAM 34 under control of the CPU 31. In other words, these structural elements shown in FIG. 3 are provided by means of software. Further, the RAM 34 functions as a buffer that temporarily stores data received from the communications lines 21 and 23.

Figure 1:
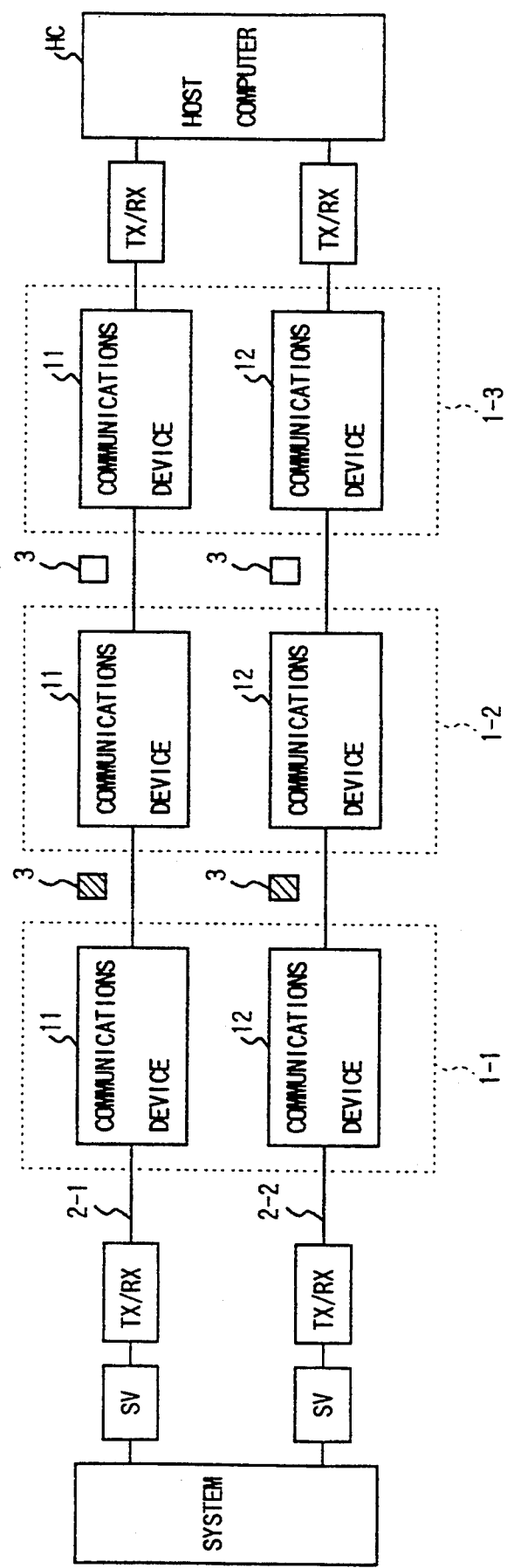
FIG. 1 is a block diagram of a communications system having a plurality of duplicated communications processing systems.

The I/O device 36 has a data input function and a data output function, and includes, for example, a keyboard and a display or printer. The contents of the flag tables 11f and 12f can be input by an operator via the I/O device 36. Alternatively, it is possible to write flag data into the flag tables 11f and 12f from the host computer HC (FIG. 1). The adapter 37 provides an interface between another communications device (not shown) and the bus 38 of the first communications device 110. The bus 38 connects the above structural elements of the first communications device 110 to each other.

Figure 6:
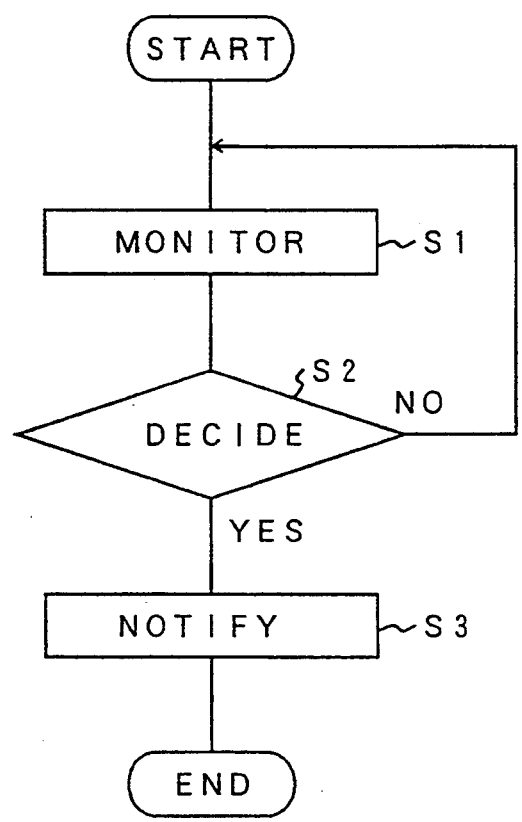
FIG. 6 is a flowchart of the operation of an overload supervisory unit shown in FIG. 3.

A description will now be given of the operation of the embodiment of the present invention. FIG. 6 is a flowchart of the overload supervisory unit 11g. The operation of the overload supervisory unit 12g is the same as that of the overload supervisory unit 11g. In step S1 shown in FIG. 6, the overload supervisory unit 11g reads data necessary to determine whether or not the first communications device 110 is working in the overload state.

Figure 7:
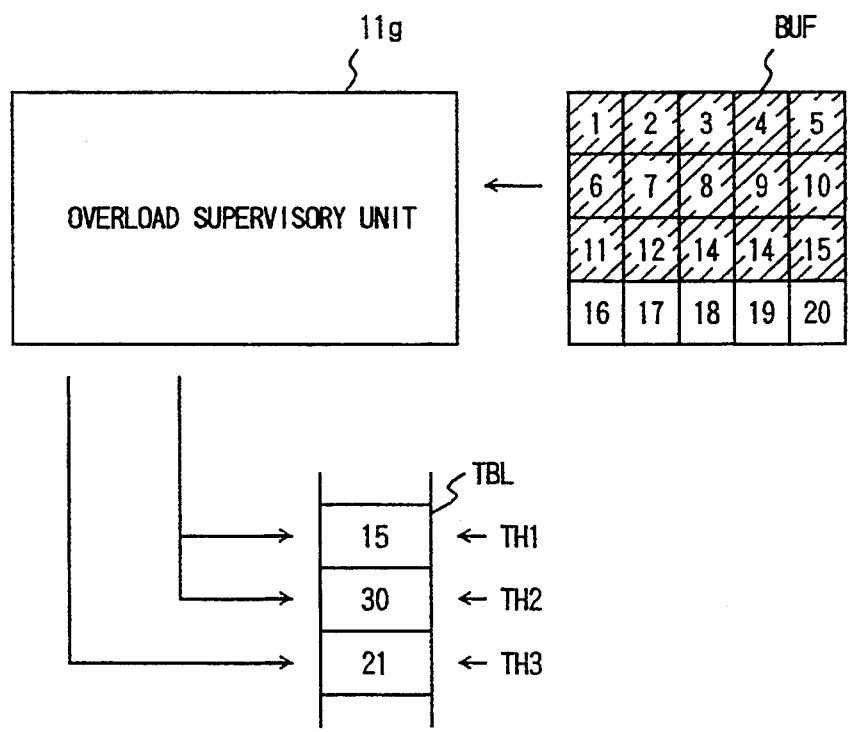
FIG. 7 is a diagram showing the operation of the overload supervisory unit.

FIG. 7 is a diagram illustrating how to determine whether or not the first communications device 110 is working in the overload state. The overload supervisory unit 110 monitors a buffer BUF formed in the RAM 34. As has been described, the buffer BUF functions to store received data. The buffer BUF shown in FIG. 7 has 20 buffer units, each having a given storage capacity. The overload supervisory unit 11g writes data indicating the number of busy buffer units into an internal table TBL. Then, the overload supervisory unit 11g determines whether or not the number of busy buffer units is equal to or greater than a first threshold value TH1, which is, for example, "15". When it is determined that 15 or more buffer units are busy, the overload supervisory unit 11g determines that the first communications device 110 is operating in the overload state, and generates the overload detection signal.

Further, the overload supervisory unit 11g monitors the number of pieces of data which are received per unit time, and writes data indicating the number of pieces of data received per unit time into the internal table TBL. In the example shown in FIG. 7, 30 pieces of data were received per unit time. Then, the overload supervisory unit 11g determines whether or not the number of pieces of data received per unit time is equal to or greater than a second threshold value TH2, which is equal, for example, to "30". Each piece of data has a predetermined data length. When it is determined that the number of pieces of data received per unit time is equal to or greater than the second threshold value TH2, the overload supervisory unit 11g determines that the first communications device 110 is operating in the overload state, and generates the overload detection signal.

Furthermore, the overload supervisory unit 11g monitors the number of pieces of data received for a predetermined period of time, and writes data indicating the number of pieces of data received for the predetermined period into the internal table TBL. Then, the overload supervisory unit 11g determines whether or not the number of pieces of data received for the predetermined period is equal to or greater than a third threshold value TH3, which is equal to, for example "30" in the example shown in FIG. 7. When the result of this determination is affirmative, the overload supervisory unit 11g generates the overload detection signal. The above-mentioned determination process is carried out in step S2 shown in FIG. 6.

In step S3 shown in FIG. 6, the overload supervisory unit 11g sends the overload detection signal to the second-communications-device supervisory unit 12e shown in FIG. 3.

Figure 8:
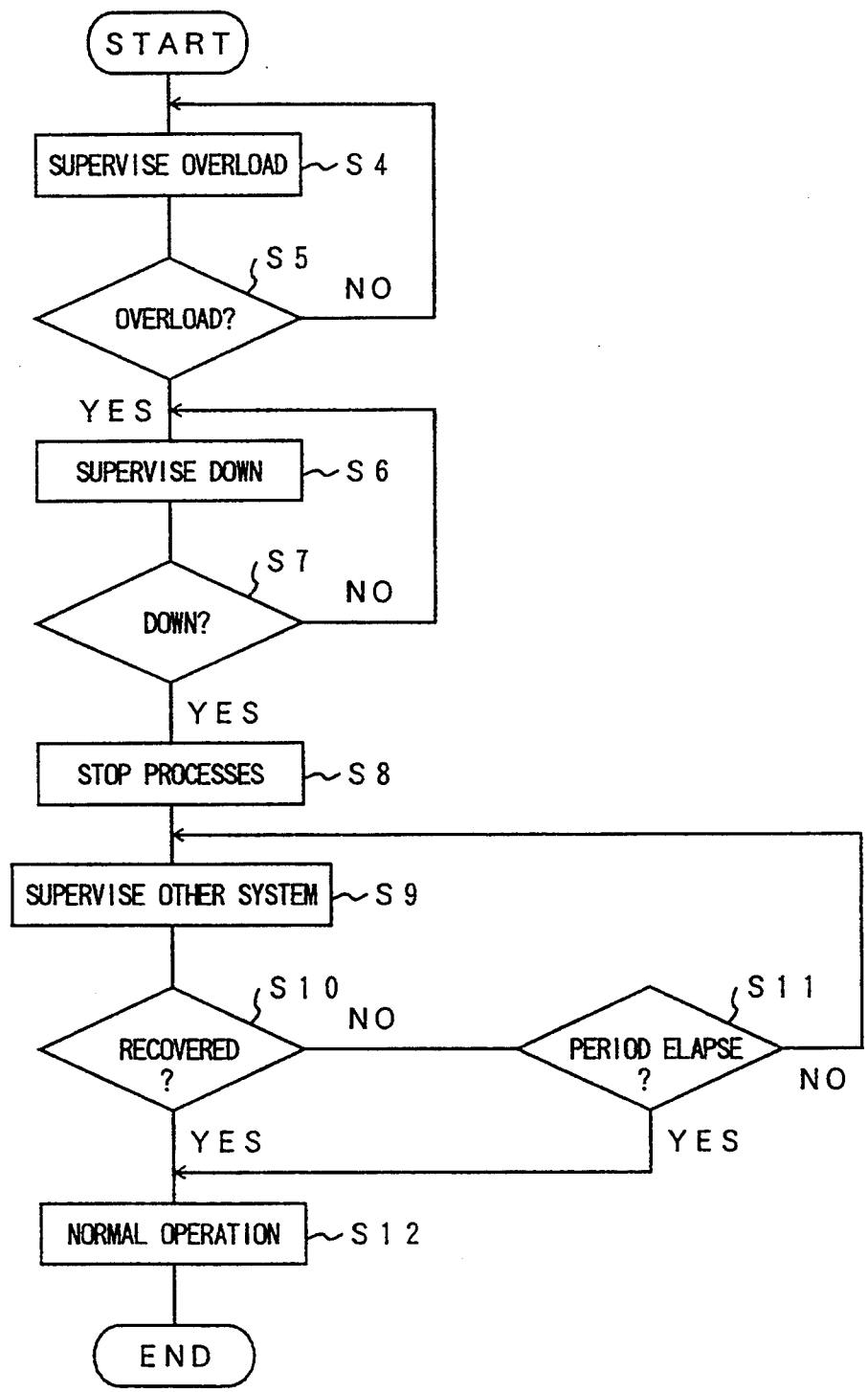
FIG. 8 is a flowchart of the operation of an other-system supervisory unit.

In response to receipt of the overload detection signal from the overload supervisory unit 11g, the second-communications-device supervisory unit 12e operates, as shown in FIG. 8. The supervisory unit 12e monitors the overload supervisory unit 11g in step S4, and determines whether or not the overload detection signal from the overload supervisory unit 11g is received in step S5. When the result of step S5 is YES, the supervisory unit 12e starts to monitor the watchdog timer monitor unit 11d in step S6, and determines whether or not the system-failure detection signal from the watchdog timer monitor unit 11d due to timeout of the built-in watchdog timer is received in step S7. When the result of step S8 is YES, that is, when the supervisory unit 12e determines that the first communications device 110 has gone down due to the overload, the supervisory unit 12e refers to the process flag table 12f shown in FIG. 4, and stops executing the processes B and C in step S8.

The supervisory unit 12e monitors the watchdog timer monitor unit 11d and the overload supervisory unit 11g in step S9, and determines whether or not the first communications device 110 has been recovered from the down state in step S10. When the first communications device 110 is recovered from the down state, the system-failure detection signal generated by the watchdog timer monitor unit 11d is turned OFF, and the overload detection signal generated by the overload supervisory unit 11g is also turned OFF by the initial program loading process in the first communications device 110. In step S12, the supervisory unit 12e restarts to execute the processes B and C, so all the processes A, B and C are executed in the second communications device 120.

When the result of step S10 is NO, the first-communications-device supervisory unit 12e determines whether or not a given period of time has elapsed in step S11. When the result of step S11 is NO, step S9 is executed again. When the result of step S11 is YES, step S12 is executed. Step S11 is provided in order to restart the processes B and C without waiting for recovery of the first communications device 110 because the first communications device 110 may not restart by the initial program loading process.

According to the embodiment of the present invention, the process A continues to be executed even if the first communications device is down. The process A is, for example, a switching function of transferring data received from the upstream side to a communications device on the downstream side. Hence, in the system shown in FIG. 1, data can be transferred between the system to be supervised and the host computer even if one of the two communications systems fails to operate.

The processes B and C have priority less than that of the process A. For example, the processes B and C are a data assembling process and a data disassembling process. In the duplicated communications systems provided between the host computer and the system to be supervised, in some cases it is required that predetermined data is extracted from the received data and is used to inform the operator or another communications device of necessary information by means of the I/O device 36 (FIG. 5). It is also required that predetermined data be input by the operator by means of the I/O device 36 or received from an other communications device and is transferred to the host computer or the system to be supervised. Execution of these processes is interrupted when the other system is down. A data editing process for editing received data in a predetermined manner, and a maintenance process for monitoring the status of the communications device can be provided as the processes B and C. Furthermore, the process B or C may be a utility program, such as a program of changing the status of the communications device. For example, data other than default data can be set in the communication device.

The communications lines 21–24 are, for example, HDLC (High-level Data Link Control) lines. In this case, data is transferred as a packet.

The present invention is not limited to the specifically disclosed embodiment, and variations and modifications may be made without departing from the scope of the present invention.

What is claimed is:

1. A duplicated communications processing system for transferring data between a first system and a second system, said duplicated communications processing system comprising:

a first communications device, connected to a first communications line coupled to said first system, for receiving data therefrom and for executing n processes to process said data, and transfer processed data to said second system where n is an integer;

a second communications device [which is connected to a second communications line coupled to said first system, for receiving data therefrom and for executing n processes to process said data and transfer processed data to said second system; and control means, coupled to said first and second communications devices, for determining whether or not a failure to execute at least one of said n processes occurs in one of the first and second communications devices due to an overload resulting from an increased amount of data received from a corresponding one of the first and second communications lines and for inhibiting m processes among the n processes from being executed in another one of the first and second communications devices when determining that the failure occurs in said one of the first and second communications devices in order to prevent an overload on said another of the first and second communications devices, said m being an integer smaller than said n.

2. The duplicated communications processing system as claimed in claim 1, wherein the m processes have lower priority levels of execution than priority levels of execution of (n−m) processes.

3. The duplicated communications processing system as claimed in claim 1, wherein said (n−m) processes include a switching process for transferring data received on an upstream side of the duplicated communications processing system to a downstream side thereof.

4. The duplicated communications processing system as claimed in claim 1, wherein:

the first communications device comprises a first buffer means for storing data received via the first communications line and indicating a storage status depending on the amount of data stored in the first buffer;

the second communications device comprises a second buffer for storing data received via the second communications line and indicating a storage status depending on the amount of data stored in the second buffer; and said control means comprises overload supervisory means, coupled to the first and second buffers, for determining whether or not the failure occurred in the first communications device on the basis of said storage status of the first buffer and for determining whether or not the failure occurred in the second communications device on the basis of said storage status of the second buffer.

5. The duplicated communications processing system as claimed in claim 4, wherein:

the first buffer has divided buffer units, and the second buffer has divided buffer units; and said overload supervisory means comprises decision means for determining whether or not a predetermined number of divided buffer units among the divided buffer units of the first buffer has become full of data received via the first communications line and for determining whether or not said predetermined number of divided buffer units among the divided buffer units of the second buffer has become full of data received via the second communications line.

6. The duplicated communications processing system as claimed in claim 4, wherein said overload supervisory means determines whether or not a predetermined quantity of data is received via the first communications line and written into the first buffer means per unit time and for determining whether or not said predetermined quantity of data is received via the second communications line and written into the second buffer means per unit time.

7. The duplicated communications processing system as claimed in claim 4, wherein said overload supervisory means determines whether or not a predetermined quantity of data is received via the first communications line and written into the first buffer means for a predetermined period of time and for determining whether or not said predetermined quantity of data is received via the second communications line and written into the second buffer means for said predetermined period.

8. The duplicated communications processing system as claimed in claim 1, wherein said control means comprises:
a first watchdog timer for generating a first system-failure detection signal indicating that the failure occurred in the first communications device when a timer value of the first watchdog timer reaches a predetermined timer value; and
a second watchdog timer for generating a second system-failure detection signal indicating that the failure occurred in the second communications device when a timer value of the second watchdog timer reaches said predetermined timer value.

9. The duplicated communications processing system as claimed in claim 1, wherein said control means comprises table means for storing flag data specifying said m processes.

10. The duplicated communications processing system as claimed in claim 1, wherein the first communications device comprises:
first overload supervisory means for determining whether or not the first communications device is operating in an overload state; and
first failure detecting means for determining whether or not the first communications device fails to execute at least one of said n processes due to an overload of the first communications device,
wherein the second communications device comprises:
second overload supervisory means for determining whether or not the second communications device is operating in an overload state; and
second failure detecting means for determining whether or not the second communications device fails to execute at least one of said n processes due to an overload of the second communications device, and
wherein the control means comprises:
first means for inhibiting said m processes from being executed in the first communications device when the second failure detecting means determines that the second communications device fails to execute at least one of said n processes due to the overload detected by the second overload supervisory means; and
second means for inhibiting said m processes from being executed in said second communications device when the first failure detecting means determines that the first communications device fails to execute at least one of said n processes due to the overload detected by the first overload supervisory means.

11. A communications system comprising: a first system;
a second system; and
at least one duplicated communications processing system for transferring data between the first system and the second system,
said at least one duplicated communications processing system comprising:
a first communications device, connected to a first communications line coupled to said first system, for receiving data therefrom and executing n processes to process said data, and transfer processed data to said second system where n is an integer;
a second communications device, connected to a second communications line coupled to said first system, for receiving data therefrom and executing n processes executed in the second communications device said data;
control means, coupled to said first and second communications devices, for determining whether or not a failure to execute at least one of said n processes occurs in one of the first and second communications devices due to an overload resulting from an increased amount of data received from a corresponding one of the first and second communications lines and for inhibiting m processes among the n processes from being executed in another of the first and second communications devices when determining that the failure occurs in said one of the first and second communications devices in order to prevent an overload on said another of the first and second communications devices, said m being an integer smaller than said n.

12. The communications system as claimed in claim 11, wherein the m processes have lower priority levels of execution than priority levels of execution of (n−m) processes.

13. The communication system as claimed in claim 12, wherein said (n−m) processes include a switching process for transferring data received on an upstream side of the duplicated communications processing system to a downstream side thereof.

14. The communications system as claimed in claim 11, wherein:
the first communications device comprises a first buffer means for storing data received via the first communications line and indicating a storage status depending on the amount of data stored in the first buffer;
the second communications device comprises a second buffer for storing data received via the second communications line and indicating a storage status depending on the amount of data stored in the second buffer; and
said control means comprises overload supervisory means, coupled to the first and second buffers, for determining whether or not the failure occurs in the first communications device on the basis of said storage status of the first buffer and for determining whether or not the failure occurs in the second communications device on the basis of said storage status of the second buffer.

15. The communications system as claimed in claim 14, wherein:

the first buffer means has divided buffer units, and the second buffer has divided buffer units; and said overload supervisory means comprises decision means for determining whether or not a predetermined number of divided buffer units among the divided buffer units of the first buffer has become full of data received via the first communications line and for determining whether or not said predetermined number of divided buffer units among the divided buffer units of the second buffer has become full of data received via the second communications line.

16. The communications system as claimed in claim 14, wherein said overload supervisory means determines whether or not a predetermined quantity of data is received via the first communications line and written into the first buffer means per unit time and for determining whether or not said predetermined quantity of data is received via the second communications line and written into the second buffer means per unit time.

17. The communications system as claimed in claim 14, wherein said overload supervisory means determines whether or not a predetermined quantity of data is received via the first communications line and written into the first buffer means for a predetermined period of time and for determining whether or not said predetermined quantity of data is received via the second communications line and written into the second buffer means for said predetermined period.

18. The communications system as claimed in claim 11, wherein said control means comprises:

a first watchdog timer for generating a first system-failure detection signal indicating that the failure occurred in the first communications device when a timer value of the first watchdog timer reaches a predetermined timer value; and a second watchdog timer for generating a second system-failure detection signal indicating that the failure occurred in the second communications device when a timer value of the second watchdog timer reaches said predetermined timer value.

19. The communications system as claimed in claim 11, wherein said control means comprises table means for storing flag data specifying said m processes.

20. The communications system as claimed in claim 11, wherein the first communications device comprises:

first overload supervisory means for determining whether or not the first communications device is operating in an overload state; and first failure detecting means for determining whether or not the first communications device fails to execute at least one of said n processes due to an overload of the first communications device, wherein the second communications device comprises:

second overload supervisory means for determining whether or not the second communications device is operating in an overload state; and second failure detecting means for determining whether or not the second communications device fails to execute at least one of said n processes due to an overload of the second communications device, and wherein the control means comprises:

first means for inhibiting said m processes from being executed in the first communications device when the second failure detecting means determines that the second communications device fails to execute at least one of said n processes due to the overload detected by the second overload supervisory means; and second means for inhibiting said m processes from being executed in said second communications device when the first failure detecting means determines that the first communications device fails to execute at least one of said processes due to the overload detected by the first overload supervisory means.

* * * * *